(12) United States Patent
Hitomi et al.

(10) Patent No.: US 7,096,833 B2
(45) Date of Patent: Aug. 29, 2006

(54) CONTROL DEVICE FOR SUPERCHARGED ENGINE

(75) Inventors: Mitsuo Hitomi, Aki-gun (JP); Kouji Asanomi, Aki-gun (JP); Yoshiyuki Shinya, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 163 days.

(21) Appl. No.: 10/476,764

(22) PCT Filed: Feb. 6, 2003

(86) PCT No.: PCT/JP03/01214

§ 371 (c)(1),
(2), (4) Date: Apr. 26, 2004

(87) PCT Pub. No.: WO03/067066

PCT Pub. Date: Aug. 14, 2003

(65) Prior Publication Data

US 2006/0053786 A1 Mar. 16, 2006

(30) Foreign Application Priority Data

Feb. 6, 2002 (JP) .............................. 2002-029837

(51) Int. Cl.
*F02B 75/20* (2006.01)
*F02B 5/00* (2006.01)
*F02D 23/00* (2006.01)
*F02B 17/00* (2006.01)
*F02B 75/02* (2006.01)

(52) U.S. Cl. .................. 123/58.8; 60/601; 60/620; 123/305

(58) Field of Classification Search ................. 60/601, 60/620; 123/58.8, 305
See application file for complete search history.

(56) References Cited

U.S. PATENT DOCUMENTS 4,194,472 A 3/1980 Amano et al. .............. 123/58.8

(Continued)

FOREIGN PATENT DOCUMENTS

JP 10-274085 10/1998

(Continued)

OTHER PUBLICATIONS

Miyoshi N et al.: "Development of New Concept Three-Way Catalyst for Automotive Lean-Burn Engines" SAE Technical Paper Series, Society of Automotive Engineers, Warrendale, PA, US, 1995, pp. 1361-1370.

*Primary Examiner*—Thai-Ba Trieu
(74) *Attorney, Agent, or Firm*—Nixon Peabody LLP; Donald R. Studebaker

(57) ABSTRACT

In a pair of preceding and following cylinders whose exhaust and intake strokes overlap each other, intake air supplied to the preceding cylinder (2A, 2D) is supercharged by a turbocharger (23) to produce combustion at a "lean" air-fuel ratio in the preceding cylinder (2A, 2D), and burned gas discharged from the preceding cylinder (2A, 2D) is introduced into the following cylinder (2B, 2C) through an intercylinder gas channel (22). Combustion in the following cylinder (2B, 2C) is made at an air-fuel ratio equal to or smaller than the stoichiometric air-fuel ratio by supplying fuel to the burned gas of a "lean" air-fuel ratio introduced from the preceding cylinder (2A, 2D), and gas discharged from the following cylinder (2B, 2C) is led to an exhaust passage (20) provided with a three-way catalyst (30).

10 Claims, 6 Drawing Sheets

U.S. PATENT DOCUMENTS

| | | | |
|---|---|---|---|
| 4,237,832 A | 12/1980 | Hartig et al. | 123/58.8 |
| 5,103,645 A * | 4/1992 | Haring | 60/620 |
| 5,261,238 A * | 11/1993 | Olsen | 60/620 |
| 6,328,003 B1 * | 12/2001 | Gaertner et al. | 123/58.8 |
| 6,543,398 B1 * | 4/2003 | Roberts et al. | 123/58.8 |
| 6,880,500 B1 * | 4/2005 | Verschoor | 123/58.8 |
| 2001/0017123 A1 | 8/2001 | Raab et al. | 123/305 |
| 2004/0168655 A1 * | 9/2004 | Hitomi et al. | 123/58.8 |

FOREIGN PATENT DOCUMENTS

| | | |
|---|---|---|
| WO | WO 91/05945 | 5/1991 |

* cited by examiner

CONTROL DEVICE FOR SUPERCHARGED ENGINE

TECHNICAL FIELD

This invention relates to a control device for a supercharged engine. More particularly, the invention pertains to a device for controlling combustion state in individual cylinders to improve fuel economy and characteristics of emissions in a multicylinder engine.

BACKGROUND ART

There exists a conventionally known technique for achieving an improvement in fuel economy by performing combustion in a state of "lean" air-fuel ratio in which air-fuel mixture in individual cylinders of a spark-ignition engine is burnt at an air-fuel ratio larger than the stoichiometric air-fuel ratio. One example of this kind of engine is shown in Japanese Unexamined Patent Publication No. H10-274085, which employs fuel injectors for injecting fuel directly into combustion chambers to cause stratified charge combustion by injecting fuel during a compression stroke in a low-speed, low-load range, for example, to thereby accomplish extremely lean mixture combustion.

In this kind of engine, it is impossible to achieve sufficient emission-cleaning performance with respect to nitrogen oxides (NOx) under lean burn operating conditions by using an ordinary three-way catalyst alone, which is a catalyst having high performance to convert hydrocarbons (HC), carbon monoxide (CO) and NOx at about the stoichiometric air-fuel ratio, as an emission-cleaning catalyst. Therefore, as shown in the aforementioned Publication, the engine is provided with a lean NOx catalyst which adsorbs NOx in an oxygen-rich atmosphere and releases and reduces NOx in an atmosphere where oxygen concentration has decreased. If the amount of NOx adsorbed by the lean NOx catalyst increases under the lean burn operating conditions when the lean NOx catalyst of this kind is being used, the fuel is injected not only for primary combustion but an additional amount of fuel is injected during an expansion stroke to decrease the air-fuel ratio and generate CO for accelerating release and reduction of NOx as shown in the aforementioned Publication, for example.

The aforementioned engine which performs conventional lean burn operation requires the lean NOx catalyst to provide NOx-converting performance during the lean burn operating conditions. This type of engine also requires the three-way catalyst for cleaning emissions in such engine operating ranges as a high-load range in which the engine is operated at the stoichiometric air-fuel ratio. The lean NOx catalyst provided along with the three-way catalyst needs to have a relatively large capacity to provide a capability to adsorb a certain amount of NOx and is expensive as compared to the three-way catalyst, so that the provision of this lean NOx catalyst is disadvantageous from the viewpoint of product cost.

In addition, it is necessary to temporarily decrease the air-fuel ratio by feeding additional amounts of fuel to accelerate release and reduction of NOx at specific intervals of time when the amount of NOx adsorbed increases as stated above in order to maintain the converting performance of the lean NOx catalyst. This would jeopardize fuel economy improvement effect offered by lean burn operation.

Furthermore, the lean NOx catalyst is susceptible to poisoning by sulfurization when the used fuel contains high sulfur content. The lean NOx catalyst should therefore be subjected to regeneration treatment, such as catalyst heating and feeding of a reducing agent, to prevent this sulfur-poisoning problem. This regeneration treatment of the lean NOx catalyst is likely to cause a reduction in the fuel economy improvement effect and deterioration of its durability.

While the aforementioned type of engine is normally operated by stratified charge combustion of a lean mixture in lower-load operating ranges of the engine and by uniform charge combustion at an air-fuel ratio lower than the stoichiometric air-fuel ratio in higher-load operating ranges to ensure desired engine output performance, it is preferable to provide good fuel economy and emission quality up to as high-load ranges as possible.

The invention has been made in consideration of the aforementioned problems of the prior art. Accordingly, it is an object of the invention to provide a control device of a spark-ignition engine capable of providing improved emission-cleaning performance by use of a three-way catalyst alone, without the need for a lean NOx catalyst, while ensuring a fuel economy improvement effect of lean burn operation. It is a further object of the invention to provide a control device of a spark-ignition engine capable of providing good fuel economy and emission quality up to higher-load operating ranges of the engine while maintaining desired engine output performance by use of a supercharger.

DISCLOSURE OF THE INVENTION

A control device of the invention is intended for use in for a multicylinder supercharged engine of which individual cylinders go through successive cycles of intake, compression, expansion and exhaust strokes with specific phase delays, in which, of a pair of cylinders whose exhaust and intake strokes overlap each other, the cylinder which is currently in the exhaust stroke serves as a preceding cylinder while the cylinder which is currently in the intake stroke serves as a following cylinder, gas flow paths are configured such that burned gas discharged from the preceding cylinder is introduced directly into the following cylinder through an intercylinder gas channel and gas discharged from only the following cylinder is led to an exhaust passage, and the engine is provided with a supercharger for supercharging intake air supplied to the preceding cylinder and a three-way catalyst disposed in the exhaust passage. The control device comprises a controller for controlling fuel supply to the individual cylinders in such a manner that combustion in the preceding cylinder is made under lean mixture conditions at an air-fuel ratio larger than the stoichiometric air-fuel ratio by a specific amount, and combustion in the following cylinder is made at an air-fuel ratio equal to or smaller than the stoichiometric air-fuel ratio by supplying fuel to the burned gas of a large air-fuel ratio introduced from the preceding cylinder in all operating ranges of the engine.

According to this construction, combustion in the preceding cylinder is made under lean mixture conditions, producing a significant fuel economy improvement effect due to an increase in thermal efficiency and a reduction in pumping loss, while combustion in the following cylinder is made at an air-fuel ratio equal to or smaller than the stoichiometric air-fuel ratio by supplying the fuel to the burned gas of a large air-fuel ratio introduced from the preceding cylinder, producing a fuel economy improvement effect due to at least a reduction in pumping loss, in all operating ranges of the engine. Furthermore, sufficient emission-cleaning performance is produced by the three-way catalyst alone, without the need for a lean NOx catalyst, because only the gas of an air-fuel ratio equal to or smaller than the stoichiometric air-fuel ratio discharged from the following cylinder is led to the exhaust passage.

Furthermore, the amount of NOx emission is sufficiently decreased. This is because combustion in the preceding cylinder is made at a "lean" air-fuel ratio to keep the amount of NOx generated in the preceding cylinder to a relatively low level, and the burned gas is introduced from the preceding cylinder into the following cylinder to create a condition equivalent to what would occur when a great deal of exhaust gas is introduced by exhaust gas recirculation (EGR). This arrangement is advantageous for improving the quality of emissions from such a point of view as well.

Moreover, since the intake air supplied to the preceding cylinder is supercharged by the supercharger, it is possible to produce lean burn operation in the preceding cylinder with an increased amount of fresh air supplied thereinto and to make combustion in the following cylinder with the burned gas introduced thereinto while injecting a proper quantity of fuel needed for generating required torques even in a high-load range of the engine. This makes it possible to significantly improve fuel economy in the high-load range.

In this invention, it is preferable to make the air-fuel ratio in the preceding cylinder approximately equal to twice the stoichiometric air-fuel ratio or larger.

This arrangement serves to sufficiently increase fuel economy improvement effect gained by the lean burn operation, prevent the amount of excess air in the burned gas introduced into the following cylinder from becoming too small, and ensure combustibility in the following cylinder.

Preferably, the control device of the invention should be such that the engine has a fuel injector for injecting the fuel directly into the preceding cylinder, and the controller causes stratified charge combustion to occur in the preceding cylinder by injecting the fuel during its compression stroke from the fuel injector while producing a lean mixture state in the preceding cylinder.

In this construction, combustion in the preceding cylinder is made in a desirable fashion by stratification even at a "lean" air-fuel ratio.

The controller should preferably control fuel supply such that the air-fuel ratio in the following cylinder becomes equal to the stoichiometric air-fuel ratio at least in a low-load range of the engine.

This arrangement enables the three-way catalyst to exhibit its emission-cleaning performance in a desirable fashion at least in the low-load range of the engine.

Specifically, it is preferable that the controller make the air-fuel ratio in the following cylinder equal to the stoichiometric air-fuel ratio in other than the high-load range of the engine and make the air-fuel ratio in the following cylinder smaller than the stoichiometric air-fuel ratio in the high-load range.

This arrangement enables the three-way catalyst to exhibit its emission-cleaning performance in a desirable fashion in other than the high-load range of the engine and prevent an increase in heat load in the following cylinder in the high-load range.

In another preferable form of the invention, the engine has a fuel injector for injecting the fuel directly into the following cylinder, and the controller causes the fuel injector to inject at least part of the fuel in the compression stroke of the following cylinder.

In this construction, stratified charge combustion or slightly stratified charge combustion is produced in the following cylinder, so that combustion in the following cylinder is made in a desirable fashion even in a condition equivalent to what would occur when a great deal of exhaust gas is introduced by EGR operation.

Alternatively, the fuel may be supplied to the following cylinder in its intake stroke.

This would be effective if it is possible to maintain ignitability in the following cylinder even when the fuel is uniformly dispersed therein due to a sufficiently high temperature of the burned gas introduced from the preceding cylinder into the following cylinder, for example.

It is also preferable that combustion in the following cylinder be caused by compressed self-ignition in a part-load range of the engine.

This would serve to increase the thermal efficiency by compressed self-ignition in the following cylinder, resulting in a further improvement in fuel economy.

BEST MODE FOR CARRYING OUT THE INVENTION

Embodiments of the present invention are now described with reference to the drawings.

Figure 1:
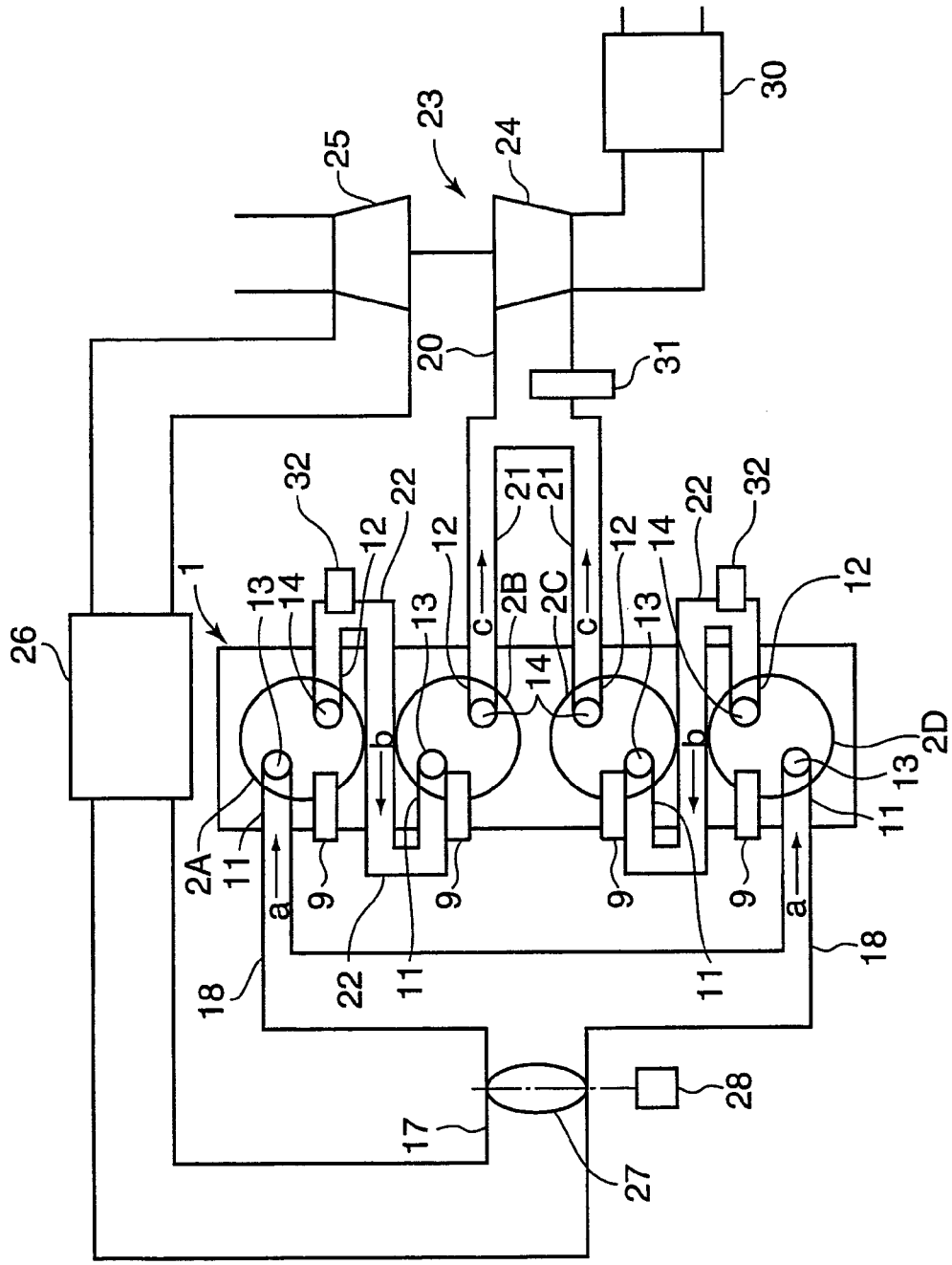
FIG. 1 is a general plan view of an entire engine provided with a control device according to an embodiment the invention.
Figure 2:
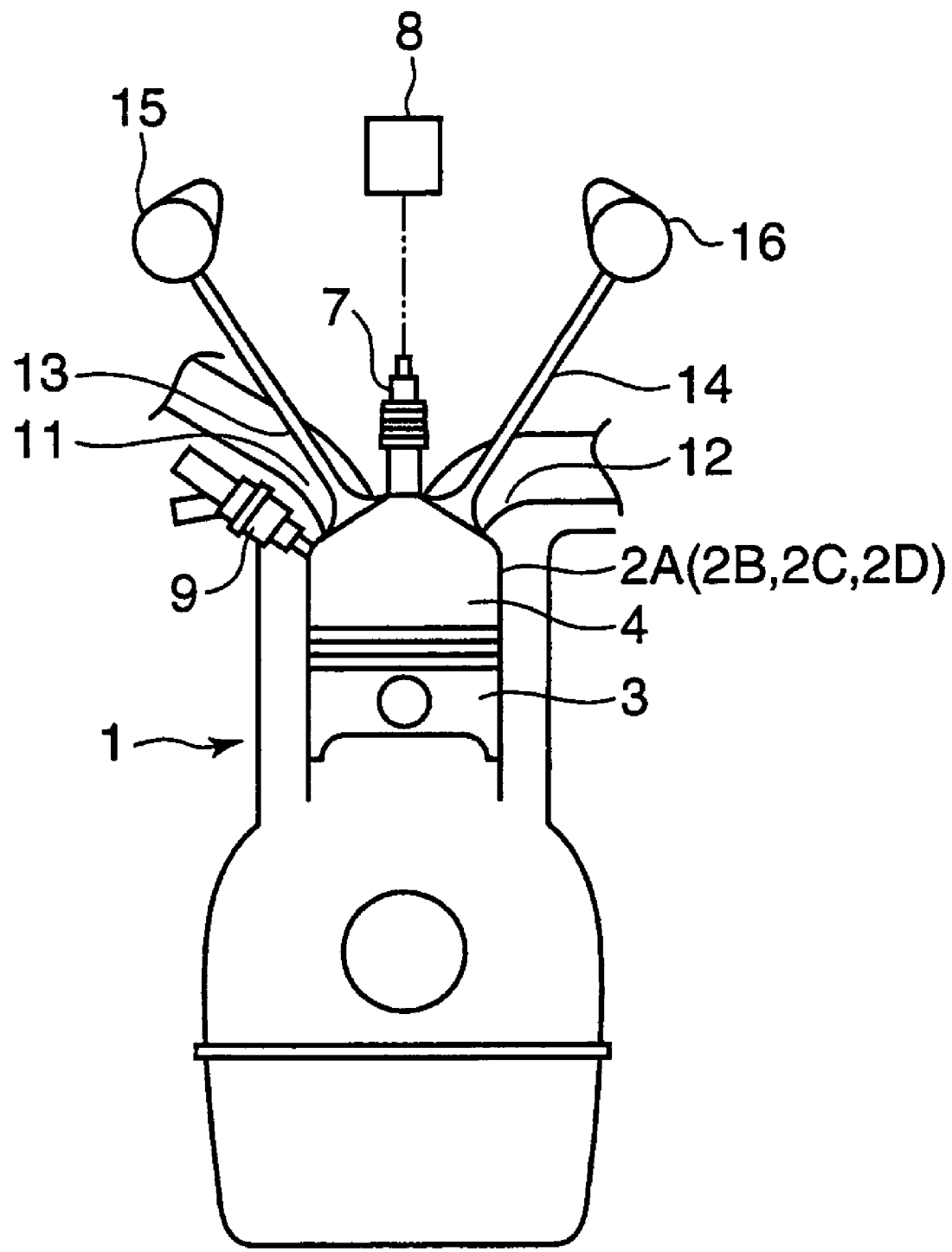
FIG. 2 is a schematic cross-sectional view of an engine body and associated elements.

FIG. 1 shows the general construction of an engine provided with a control device according to an embodiment of the invention, and FIG. 2 generally shows the construction of one cylinder of an engine body, intake and exhaust valves, etc. provided for the cylinder. Referring to these Figures, the engine body 1 has a plurality of cylinders. Specifically, it has four cylinders designated 2A to 2D in, the illustrated embodiment, with one each piston 3 fitted in the individual cylinders 2A–2D and a combustion chamber 4 formed above the piston 3.

There is provided a spark plug 7 at the top of the combustion chamber 4 in each cylinder 2 in such a way that a far end of the spark plug 7 is located inside the combustion chamber 4. The spark plug 7 is connected to an ignition circuit 8 which permits electronic control of ignition timing.

On one side of the combustion chamber 4 of each cylinder 2, there is provided a fuel injector 9 for injecting fuel directly into the combustion chamber 4. The fuel injector 9 incorporates a needle valve and a solenoid which are not illustrated. Driven by a later-described pulse signal input, the fuel injector 9 causes its needle valve to open at pulse input timing during a period corresponding to the pulselength of the pulse signal and injects a specific amount of fuel determined by the valve open period. Although not illustrated, the fuel is supplied from a fuel pump to the fuel injector 9 through a fuel-feeding passage, a fuel-feeding system being so constructed as to provide a fuel pressure higher than the internal pressure of the combustion chamber 4 in each compression stroke.

Intake ports 11 and exhaust ports 12 open to the combustion chambers 4 of the individual cylinders 2A–2D, and intake valves 13 and exhaust valves 14 are provided in the respective intake ports 11 and exhaust ports 12. These intake and exhaust valves 13, 14 are caused to open and close with specific timing by a valve actuating mechanism including respective camshafts 15, 16.

Figure 5:
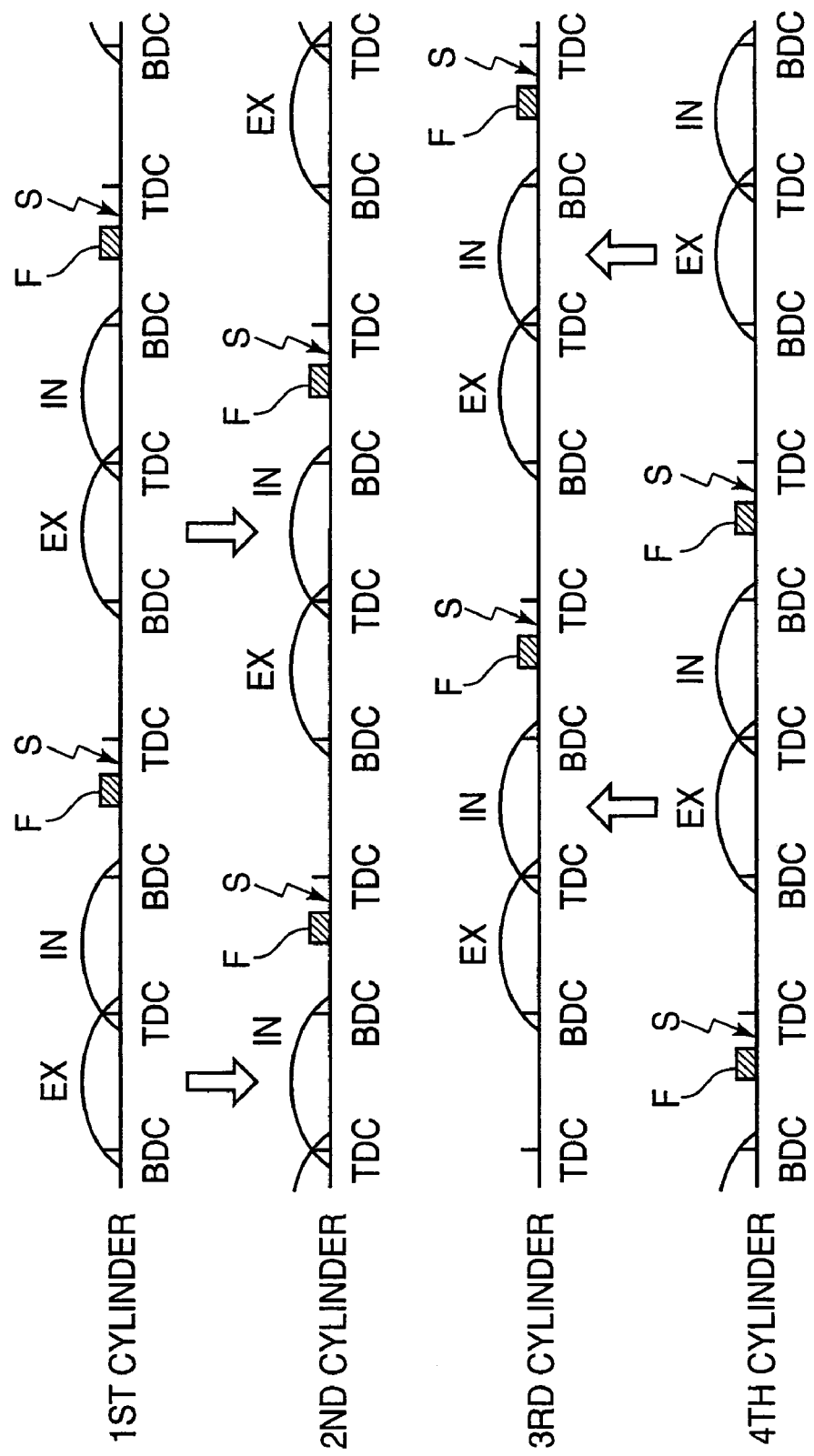
FIG. 5 is a diagram showing timing of exhaust strokes and intake strokes as well as fuel injection timing and ignition timing for individual cylinders.

The individual cylinders 2A–2D go through successive cycles of intake, compression, expansion and exhaust strokes with specific phase delays. In the four-cylinder engine, of which cylinders 2A–2D are hereinafter referred to as the first cylinder 2A, the second cylinder 2B, the third cylinder 2C and the fourth cylinder 2D as viewed from one end of cylinder bank, the aforementioned cycles are carried out in the order of the first cylinder 2A, the third cylinder 2C, the fourth cylinder 2D and the second cylinder 2B with a successive phase delay of 180° as shown in FIG. 5, in which "EX" designates exhaust strokes, "IN" designates intake strokes, "F" designates fuel injection and "S" designates ignition.

There is provided an intercylinder gas channel 22 between two cylinders of which exhaust and intake strokes overlap so that already burned gas can be led from the cylinder in the exhaust stroke (hereinafter referred to as the preceding cylinder in the present Description of the invention) to the cylinder in the intake stroke (hereinafter referred to as the following cylinder in the present Description of the invention) during a period of overlap of the exhaust and intake strokes. In the four-cylinder engine of the present embodiment, the exhaust stroke (EX) of the first cylinder 2A overlaps the intake stroke (IN) of the second cylinder 2B and the exhaust stroke (EX) of the fourth cylinder 2D overlaps the intake stroke (IN) of the third cylinder 2C as shown in FIG. 5. Therefore, the first cylinder 2A and the second cylinder 2B constitute one cylinder pair while the fourth cylinder 2D and the third cylinder 2C constitute another cylinder pair, the first cylinder 2A and the fourth cylinder 2D being the preceding cylinders and the second cylinder 2B and the third cylinder 2C being the following cylinders.

Specifically, an intake passage 17, an exhaust passage 20 and the intercylinder gas channels 22 connected to the intake and exhaust ports 11, 12 of the individual cylinders 2A–2D are configured as described in the following.

The intake passage 17 has at its downstream side two branched intake channels 18 connected to the intake ports 11 of the first cylinder 2A and the fourth cylinder 2D to supply intake air to the first cylinder 2A and the fourth cylinder 2D which are the preceding cylinders. On the other hand, the exhaust passage 20 has at its upstream side two branched exhaust channels 21 connected to the exhaust ports 12 of the second cylinder 2B and the third cylinder 2C to lead gas discharged from the second cylinder 2B and the third cylinder 2C which are the following cylinders.

The intercylinder gas channels 22 are provided between the first cylinder 2A and the second cylinder 2B and between the third cylinder 2C and the fourth cylinder 2D. Upstream ends of the intercylinder gas channels 22 are connected to the exhaust ports 12 of the first and fourth cylinders 2A, 2D which are the preceding cylinders while downstream ends of the intercylinder gas channels 22 are connected to the intake ports 11 of the second and third cylinders 2B, 2C which are the following cylinders.

There is further provided a supercharger for supplying air under high pressure to the preceding cylinders 2A, 2D. In this embodiment, the engine is provided with a turbocharger 23. The turbocharger 23 is formed of a turbine 24 provided in the exhaust passage 20 which connects to the exhaust ports 12 of the second and third cylinders 2B, 2C through the branched exhaust channels 21 and a compressor 25 provided in the intake passage 17 which connects to the intake ports 11 of the first and fourth cylinders 2A, 2D through the branched intake channels 18. In the turbocharger 23 thus constructed, the turbine 24 is caused to turn by energy of exhaust gas flowing through the exhaust passage 20. As a result, the compressor 25 interlocked with the turbine 24 turns to produce a high intake-air pressure.

An intercooler 26 for cooling supercharged intake air is provided in the intake passage 17 downstream of the compressor 25 and a throttle valve 27 is provided downstream of the intercooler 26. The throttle valve 27 is driven by an actuator 28 according to a control signal to regulate the amount of intake air.

There is provided a three-way catalyst 30 for converting the exhaust gas in the exhaust passage 20 downstream of the turbine 24. As is commonly known, the three-way catalyst 30 is a catalyst which exhibits high converting performance with respect to HC, CO and NOx when the air-fuel ratio of the exhaust gas is approximately equal to the stoichiometric air-fuel ratio (i.e., excess-air factor $\lambda=1$).

There is provided an $O_2$ sensor 31 in the exhaust passage 20 upstream of the turbine 24. Serving to detect the air-fuel ratio by measuring the concentration of oxygen in the exhaust gas, the $O_2$ sensor 31 is formed of a $\lambda O2$ sensor whose output suddenly changes particularly at around the stoichiometric air-fuel ratio.

Further, a linear $O_2$ sensor 32 whose output linearly varies with changes in oxygen concentration in the exhaust gas is provided in each of the aforementioned intercylinder gas channels 22.

Figure 3:
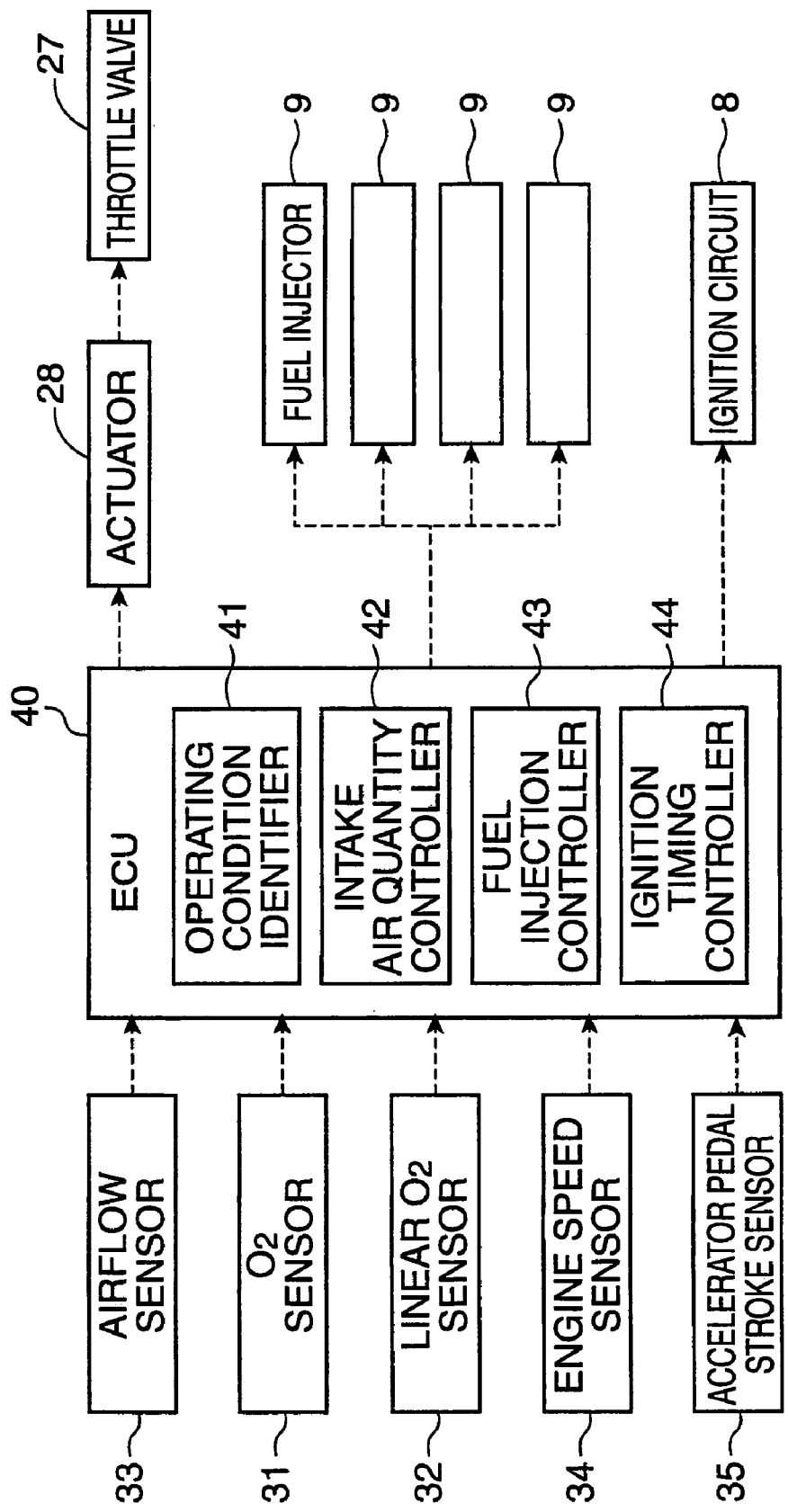
FIG. 3 is a block diagram of a control system.

FIG. 3 shows the construction of a drive/control system. Referring to this Figure, signals output from the $O_2$ sensor 31, the linear $O_2$ sensors 32 and an airflow sensor 33 for detecting the amount of intake air are input to an ECU (electronic control unit) 40 which includes a microcomputer for controlling the engine. Also input to the ECU 40 are signals output from an engine speed sensor 34 for detecting engine speed for judging operating condition of the engine and an accelerator pedal stroke sensor 35 for detecting throttle opening (the amount of depression of an accelerator). On the other hand, the ECU 40 outputs control signals to the individual fuel injectors 9, the actuator 28 of the throttle valve 27 and the ignition circuit 8.

The ECU 40 includes an operating condition identifier 41, an intake air quantity controller 42, a fuel injection controller 43 and an ignition timing controller 44.

Figure 4:
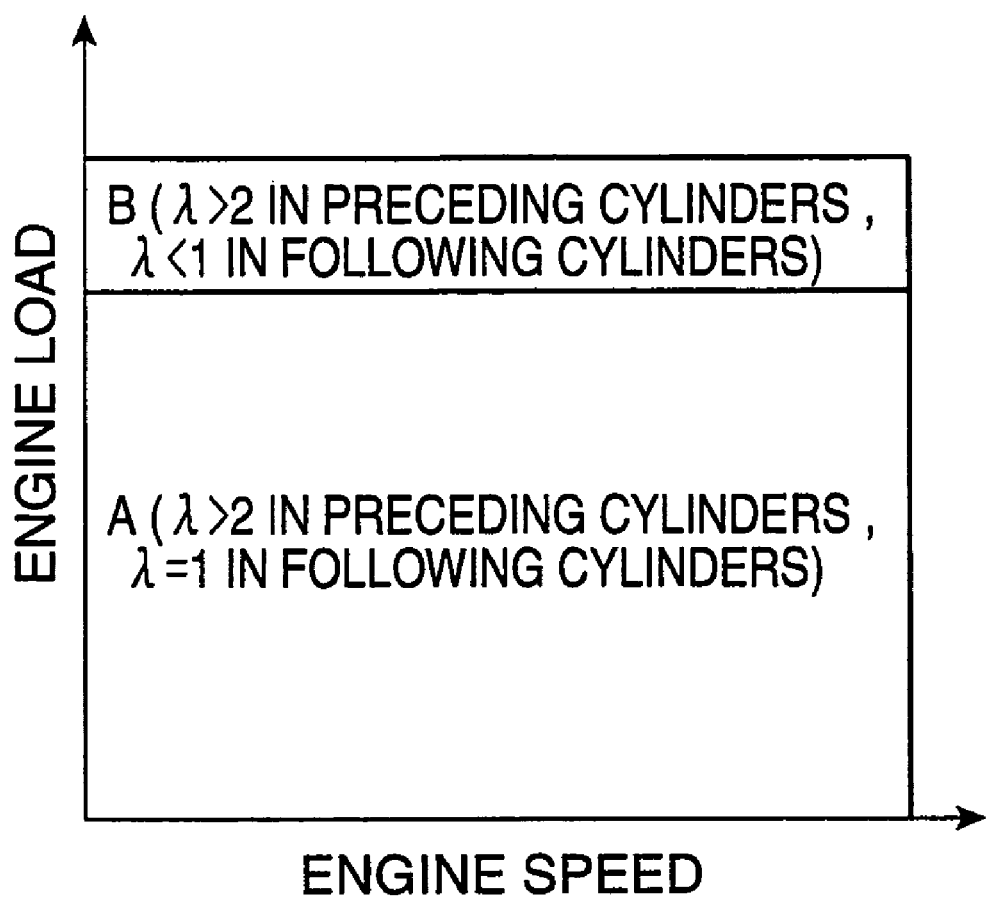
FIG. 4 is an explanatory diagram showing engine operating ranges.

The operating condition identifier 41 examines the operating condition of the engine (engine speed and load) based on the signals fed from the engine speed sensor 34, accelerator pedal stroke sensor 35, etc. and judges whether the engine operating condition falls in a low-to-medium-load operating range A or in a high-load operating range B in full-throttle-load and close-to-full-throttle regions shown in FIG. 4.

The intake air quantity controller 42 serves to control the opening of the throttle valve 27 (throttle opening) by controlling the actuator 28. Specifically, the intake air quantity controller 42 determines a target intake air quantity from a map, for example, according to the engine operating condition and controls the throttle opening according to the target intake air quantity so obtained. In this embodiment, intake air is not supplied directly to the following cylinders (second and third cylinders 2B, 2C) through the intake passage 17 but excess air in the burned gas introduced from the preceding cylinders 2A, 2D is used for combustion in the following cylinders 2B, 2C. Therefore, the throttle opening is regulated in such a manner that intake air supercharged by the turbocharger 23 and supplied to the preceding cylinders 2A, 2D is of a quantity necessary for combustion of fuel needed by two pairs of the preceding and following cylinders 2A–2B, 2D–2C to generate required torques.

The aforementioned fuel injection controller 43 serves to control the amounts of fuel to be injected from the fuel injectors 9 provided for the individual cylinders 2A–2D as well as injection timing according to the engine operating condition. Specifically, the fuel injection controller 43 controls the amounts of fuel injected into the preceding cylinders (first and fourth cylinders 2A, 2D) such that the air-fuel ratio becomes larger than the stoichiometric air-fuel ratio, preferably approximately equal to twice the stoichiometric air-fuel ratio or larger, to create a lean mixture, and sets injection timing for the preceding cylinders 2A, 2D to inject the fuel during the compression stroke to thereby produce stratified charge combustion in the preceding cylinders 2A, 2D in all operating ranges of the engine.

On the other hand, the fuel injection controller 43 controls the amounts of fuel injected into the following cylinders (second and third cylinders 2B, 2C) to create therein a rich mixture of which air-fuel ratio is equal to or smaller than the stoichiometric air-fuel ratio by supplying the fuel to the burned gas of a "lean" air-fuel ratio introduced from the preceding cylinders 2A, 2D. More particularly, the amounts of fuel injected into the following cylinders 2B, 2C are so controlled as to make the air-fuel ratio in the following cylinders 2B, 2C equal to the stoichiometric air-fuel ratio at least in low-load ranges, preferably equal to the stoichiometric air-fuel ratio in the low-to-medium-load operating range A of FIG. 4, and to lower the air-fuel ratio in the following cylinders 2B, 2C to create therein a rich mixture in the high-load operating range B of FIG. 4. Then, the fuel injection controller 43 sets fuel injection timing for the following cylinders 2B, 2C to enable ignition and combustion in an atmosphere rich in burned gas. As an example, the fuel is injected during the compression stroke to ensure ignitability.

In the operating range A of FIG. 4, in which the air-fuel ratio in the following cylinders 2B, 2C is made equal to the stoichiometric air-fuel ratio, control operation for regulating the aforementioned amounts of injected fuel is performed by feedback control based on the outputs from the airflow sensor 33, the $O_2$ sensor 31, etc. Specifically, a basic fuel injection quantity is so calculated for each cylinder based on the amount of intake air as to produce a specific "lean" air-fuel ratio in the preceding cylinders 2A, 2D and the stoichiometric air-fuel ratio in the following cylinders 2B, 2C. The amounts of fuel injected into the preceding cylinders 2A, 2D are corrected by feedback based on the outputs from the linear $O_2$ sensors 32 provided in the individual intercylinder gas channels 22, and the amounts of fuel injected into the following cylinders 2B, 2C are corrected by feedback based on the output from the $O_2$ sensor 31 provided in the exhaust passage 20.

The ignition timing controller 44 determines ignition points for the individual cylinders 2A–2D from a map and controls the ignition circuit 8 to cause ignition to occur at the ignition points so determined.

Operational effects of the aforementioned device of the present embodiment are now described with reference to FIG. 5.

The intake air supercharged by the turbocharger 23 flows downstream along the intake passage 17 and is led through the actuator 28 and the individual branched intake channels 18 (arrows "a" in FIG. 1) into the preceding cylinders (first and fourth cylinders 2A, 2D). The fuel (F) is injected into the preceding cylinders 2A, 2D in their compression stroke with the amounts of injected fuel feedback-controlled such that the air-fuel ratio detected by each linear $O_2$ sensor 32 becomes equal to the aforementioned specific "lean" air-fuel ratio, and ignition (S) is caused to occur at specific ignition points, producing stratified charge combustion at the "lean" air-fuel ratio.

Subsequently, the burned gas discharged from the preceding cylinders 2A, 2D is introduced into the respective following cylinders 2B, 2C through the intercylinder gas channels 22 during periods when the exhaust stroke of the preceding cylinders 2A, 2D overlaps the intake stroke of the following cylinders 2B, 2C, respectively (open arrows in FIG. 5 and arrows "b" in FIG. 1). In the following cylinders 2B, 2C, the fuel is supplied to the burned gas of the "lean" air-fuel ratio introduced from the preceding cylinders 2A, 2D and a resultant mixture is ignited (S) at specific ignition points to produce combustion. Particularly in the low-to-medium-load operating range A, combustion in the following cylinders 2B, 2C is made with the amounts of fuel injected into the following cylinders 2B, 2C controlled based on the output from the $O_2$ sensor 31 so that the air-fuel ratio in the following cylinders 2B, 2C becomes equal to the stoichiometric air-fuel ratio. After combustion in the following cylinders 2B, 2C, the resultant burned gas is discharged into the exhaust passage 20 in which the three-way catalyst 30 is provided (arrows "c" in FIG. 1).

Since stratified charge combustion is performed at the "lean" air-fuel ratio in the preceding cylinders 2A, 2D as stated above, thermal efficiency is improved and pumping loss is reduced in the preceding cylinders 2A, 2D, and a combined effect thereof results in a significant improvement in fuel economy. In the following cylinders 2B, 2C, on the other hand, the mixture is combusted while the air-fuel ratio is controlled to match the stoichiometric air-fuel ratio with additional fuel supplied to the burned gas in an excess-air state. Therefore, although the thermal efficiency of the following cylinders 2B, 2C is slightly low compared to the preceding cylinders 2A, 2D in which the stratified charge combustion is performed at the "lean" air-fuel ratio, it is possible to achieve a sufficient effect of improving the fuel economy due to a reduction in pumping loss.

In addition, it is not necessary to provide a lean NOx catalyst unlike conventional lean burn engines and sufficient emission-cleaning performance is ensured with the three-way catalyst 30 alone, because the gas discharged from the following cylinders 2B, 2C into the exhaust passage 20 is at the stoichiometric air-fuel ratio.

As it is not necessary to provide the lean NOx catalyst as stated above, there is no need to temporarily lower the air-fuel ratio for accelerating release and reduction of NOx when the amount of NOx adsorbed by the lean NOx catalyst has increased, whereby a decrease in fuel economy improvement effect can be avoided. Moreover, the arrangement of the embodiment does not cause the earlier-mentioned problem of poisoning of the lean NOx catalyst by sulfurization.

Furthermore, the amount of NOx emission is sufficiently decreased in this embodiment. This is because the air-fuel ratio in the preceding cylinders 2A, 2D is made extremely large, that is, approximately equal to twice the stoichiometric air-fuel ratio or larger, keeping the amount of NOx generated in these cylinders 2A, 2D to a relatively low level, and the burned gas is introduced from the preceding cylinders 2A, 2D into the following cylinders 2B, 2C to create a condition equivalent to what would occur when a great deal of exhaust gas is introduced by EGR operation. The aforementioned arrangement of the embodiment is advantageous for improving the quality of emissions from such a point of view as well.

The burned gas is introduced from the preceding cylinders 2A, 2D into the following cylinders 2B, 2C through the respective intercylinder gas channels 22 as stated above. It is possible to regulate the amount of dissipated heat by adjusting the length of each intercylinder gas channel 22, for example, and thereby regulate the temperature of the burned gas introduced into the following cylinders 2B, 2C. By regulating the temperature of the burned gas in this way and also adjusting the timing of fuel injection into the following cylinders 2B, 2C appropriately, it is possible to maintain good ignitability and combustibility in the following cylinders 2B, 2C as well into which a great deal of exhaust gas is introduced.

Although stable combustibility in the following cylinders 2B, 2C lessens when the ratio of excess oxygen to the gas introduced from the preceding cylinders 2A, 2D into the following cylinders 2B, 2C extremely decreases, the stable combustibility in the following cylinders 2B, 2C is sufficiently maintained if the air-fuel ratio in the preceding cylinders 2A, 2D is made approximately equal to twice the stoichiometric air-fuel ratio or larger.

In particular, because extremely lean mixture combustion is made in the preceding cylinders 2A, 2D while supercharging the intake air supplied to the preceding cylinders 2A, 2D by the turbocharger 23 and combustion in the following cylinders 2B, 2C is made under conditions in which the burned gas is introduced from the preceding cylinders 2A, 2D in all operating ranges of the engine as stated above, the invention offers a significantly enhanced fuel economy improvement effect.

If extremely lean mixture combustion is made in the preceding cylinders 2A, 2D and combustion in the following cylinders 2B, 2C is made under conditions in which the burned gas is introduced from the preceding cylinders 2A, 2D under high-load conditions in a naturally aspirated engine unprovided with the aforementioned turbocharger 23, it would not be able to generate sufficient torques, so that the engine should be switched to a state of ordinary combustion (in which both intake air and fuel are supplied to the individual cylinders for combustion) under high-load conditions. According to the present invention in which the intake air supplied to the preceding cylinders 2A, 2D is supercharged, however, it is possible to make extremely lean mixture combustion in the preceding cylinders 2A, 2D with an increased amount of fresh air supplied thereinto and to make combustion in the following cylinders 2B, 2C with a large amount of burned gas introduced thereinto while injecting a proper quantity of fuel needed for generating required torques even under high-load conditions. Therefore, the invention makes it possible to significantly improve fuel economy in high-load regions while maintaining approximately the same level of engine output as the naturally aspirated engine.

Generally, heat load is likely to increase in the following cylinders 2B, 2C under high-load conditions because the burned gas is introduced from the preceding cylinders 2A, 2D. Since the air-fuel ratio in the following cylinders 2B, 2C is made smaller than the stoichiometric air-fuel ratio to create a rich mixture in the high-load operating range B, however, it is possible to lessen the heat load and enhance output torques of the following cylinders 2B, 2C.

The control device of the invention is not limited in its specific construction to the foregoing embodiment but may be altered or modified in various ways. Other embodiments of the invention and variations thereof are described in the following.

Figure 6:
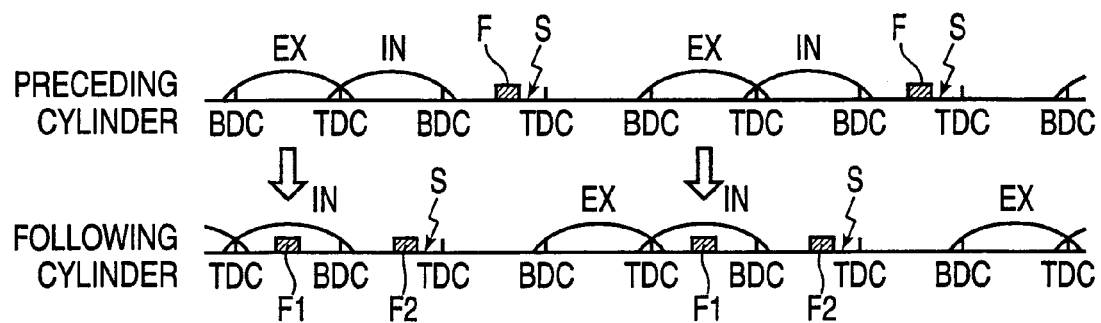
FIG. 6 is a diagram showing another example of fuel injection timing for following cylinders.

(1) Although stratified charge combustion is made at an air-fuel ratio equal to or smaller than the stoichiometric air-fuel ratio in the following cylinders 2B, 2C by setting a fuel injection point in the compression stroke in the foregoing basic embodiment, multi-point fuel injection (F1, F2) may be performed for each of the following cylinders 2B, 2C by injecting the fuel twice during the intake stroke and the compression stroke as depicted in FIG. 6. It would be possible by doing so to prevent excessive concentration of fuel around the spark plug 7 and produce combustion under slightly stratified conditions.

Figure 7:
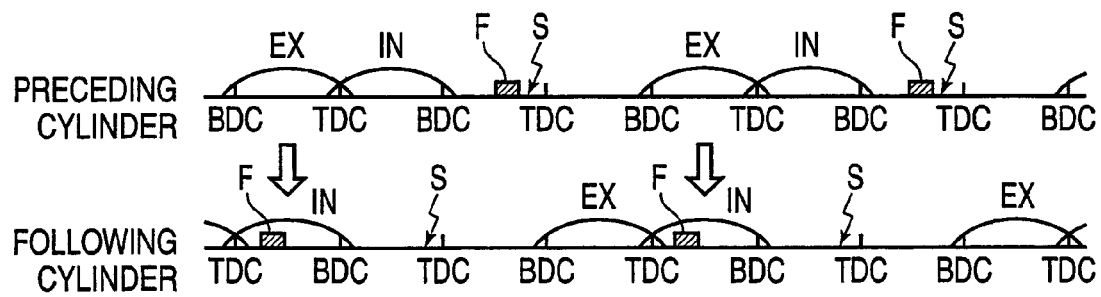
FIG. 7 is a diagram showing still another example of fuel injection timing for following cylinders.

(2) If it is possible to maintain ignitability even when the fuel is uniformly dispersed in the following cylinders 2B, 2C due to a sufficiently high temperature of the burned gas introduced from the preceding cylinders 2A, 2D into the following cylinders 2B, 2C, for example, one-point fuel injection may be performed for each of the following cylinders 2B, 2C by injecting the fuel only once during the intake stroke as depicted in FIG. 7.

(3) If it is possible to maintain ignitability even when the fuel is uniformly dispersed in the following cylinders 2B, 2C as stated above, fuel injectors provided in the following cylinders 2B, 2C need not necessarily be of a direct injection type for injecting the fuel directly into the combustion chambers 4 but may be of a type designed to inject the fuel into the intake ports 11.

(4) Since the burned gas at a high temperature is introduced from the preceding cylinders 2A, 2D into the following cylinders 2B, 2C, it is also possible to cause compressed self-ignition (self-ignition of the mixture near the top dead center in the compression stroke) in the following cylinders 2B, 2C without performing forced ignition. In particular, if one-point fuel injection is performed for each of the following cylinders 2B, 2C by injecting the fuel only once during the intake stroke, creating a state in which the burned gas and fuel are uniformly dispersed in the entire combustion chambers 4, the mixture in the following cylinders 2B, 2C would burn up in an instant by simultaneous compressed self-ignition, resulting in an improvement in thermal efficiency.

(5) The supercharger need not necessarily be the aforementioned turbocharger 23 but may be a mechanical supercharger driven by an output shaft of the engine. In this alternative, there should be made an arrangement for introducing the intake air supercharged by the mechanical supercharger into the preceding cylinders 2A, 2D.

(6) Although the air-fuel ratio in the following cylinders 2B, 2C is made smaller than the stoichiometric air-fuel ratio to create a rich mixture in the high-load operating range B in the foregoing basic embodiment, the air-fuel ratio in the following cylinders 2B, 2C may be made equal to the stoichiometric air-fuel ratio in all operating ranges of the engine if it is permitted from the viewpoint of heat load. This alternative arrangement would serve to further improve fuel economy and emission quality.

(7) The device of this invention is also applicable to multicylinder engines other than the four-cylinder engine. In a six-cylinder engine, for example, the exhaust stroke of one cylinder does not perfectly coincide in timing with the intake stroke of another cylinder. In such a case, each pair of preceding and following cylinders should be such that the exhaust stroke of one cylinder precedes and coincides in part with the intake stroke of the other cylinder.

INDUSTRIAL APPLICABILITY

A control device of the invention controls an engine having at least one pair of preceding and following cylinders of which exhaust and intake strokes overlap in such a manner that intake air supplied to the preceding cylinder is supercharged by a supercharger to make combustion at a "lean" air-fuel ratio in the preceding cylinder, burned gas discharged from the preceding cylinder is introduced into the following cylinder through an intercylinder gas channel and fuel is supplied to the burned gas of a "lean" air-fuel ratio introduced from the preceding cylinder to make combustion at an air-fuel ratio equal to or smaller than the stoichiometric air-fuel ratio in the following cylinder, and burned gas discharged from the following cylinder is led to an exhaust passage provided with a three-way catalyst. The control device thus constructed serves to significantly improve fuel economy as a result of an improvement in thermal efficiency and a reduction in pumping loss achieved by lean burn operation in the preceding cylinder as well as a reduction in pumping loss in the following cylinder, yet producing a sufficient emission-cleaning effect with the three-way catalyst alone. Consequently, a lean NOx catalyst becomes unnecessary, which is advantageous in reducing product cost, for example.

Furthermore, the control device of the invention serves to provide a remarkably enhanced fuel economy improvement effect. This is because lean mixture combustion is made in the preceding cylinder while supercharging the intake air supplied to the preceding cylinder by the supercharger and combustion in the following cylinder is made under conditions in which the burned gas is introduced from the preceding cylinder in all operating ranges of the engine.

The invention claimed is:

1. A control device for a multicylinder supercharged engine of which individual cylinders go through successive cycles of intake, compression, expansion and exhaust strokes with specific phase delays, in which, of a pair of cylinders whose exhaust and intake strokes overlap each other, the cylinder which is currently in the exhaust stroke serves as a preceding cylinder while the cylinder which is currently in the intake stroke serves as a following cylinder, gas flow paths are configured such that burned gas discharged from the preceding cylinder is introduced directly into the following cylinder through an intercylinder gas channel and gas discharged from only the following cylinder is led to an exhaust passage, and said engine is provided with a supercharger for supercharging intake air supplied to the preceding cylinder and a three-way catalyst disposed in the exhaust passage, said control device comprising:

a controller for controlling fuel supply to the individual cylinders in such a manner that combustion in the preceding cylinder is made under lean mixture conditions at an air-fuel ratio larger than the stoichiometric air-fuel ratio and combustion in the following cylinder is made at an air-fuel ratio equal to or smaller than the stoichiometric air-fuel ratio by supplying fuel to the burned gas of a large air-fuel ratio introduced from the preceding cylinder in all operating ranges of the engine.

2. The control device for the supercharged engine according to claim 1, wherein the air-fuel ratio in the preceding cylinder is made approximately equal to twice the stoichiometric air-fuel ratio or larger.

3. The control device for the supercharged engine according to claim 1, wherein the engine has a fuel injector for injecting the fuel directly into the preceding cylinder, and said controller causes stratified charge combustion to occur in the preceding cylinder by injecting the fuel during its compression stroke from the fuel injector while producing a lean mixture state in the preceding cylinder.

4. The control device for the supercharged engine according to claim 1, wherein said controller controls fuel supply such that the air-fuel ratio in the following cylinder becomes equal to stoichiometric air-fuel ratio at least in a low-load range of the engine.

5. The control device for the supercharged engine according to claim 4, wherein said controller makes the air-fuel ratio in the following cylinder equal to the stoichiometric air-fuel ratio in other than a high-load range of the engine and makes the air-fuel ratio in the following cylinder smaller than the stoichiometric air-fuel ratio in the high-load range.

6. The control device for the supercharged engine according to claim 1, wherein the engine has a fuel injector for injecting the fuel directly into the following cylinder, and said controller causes the fuel injector to inject at least part of the fuel in the compression stroke of the following cylinder.

7. The control device for the supercharged engine according to claim 1, wherein the fuel is supplied to the following cylinder in its intake stroke.

8. The control device for the supercharged engine according to claim 1, wherein combustion in the following cylinder is caused by compressed self-ignition in a part-load range of the engine.

9. A control device for a multicylinder supercharged engine of which individual cylinders go through successive cycles of intake, compression, expansion and exhaust strokes with specific phase delays, in which, of a pair of cylinders whose exhaust and intake strokes overlap each other, the cylinder which is currently in the exhaust stroke serves as a preceding cylinder while the cylinder which is currently in the intake stroke serves as a following cylinder, gas flow paths are configured such that burned gas discharged from the preceding cylinder is introduced directly into the following cylinder through an intercylinder gas channel and gas discharged from only the following cylinder is led to an exhaust passage, and said engine is provided with a supercharger for supercharging intake air supplied to the preceding cylinder, a three-way catalyst disposed in the exhaust passage, and fuel injectors for supplying fuel into the individual cylinders, said control device comprising:

a control unit for controlling the engine;

wherein said control unit controls the amount of fuel injected into the preceding cylinder in such a manner that combustion in the preceding cylinder is made under lean mixture conditions at an air-fuel ratio larger than the stoichiometric air-fuel ratio and controls the amount of fuel injected into the following cylinder in such a manner that combustion in the following cylinder is made at an air-fuel ratio equal to or smaller than the stoichiometric air-fuel ratio by supplying the fuel to the burned gas of a large air-fuel ratio introduced from the preceding cylinder in all operating ranges of the engine.

10. A control device for a four-cycle multicylinder supercharged spark-ignition engine of which individual cylinders provided with spark plugs go through successive cycles of intake, compression, expansion and exhaust strokes with specific phase delays, in which, of a pair of cylinders whose exhaust and intake strokes overlap each other, the cylinder which is currently in the exhaust stroke serves as a preceding cylinder while the cylinder which is currently in the intake stroke serves as a following cylinder, and said engine is provided with an intercylinder gas channel for introducing burned gas discharged from the preceding cylinder into the following cylinder, a supercharger disposed in an intake passage, a three-way catalyst disposed in an exhaust passage, and a fuel feeder for supplying fuel to the individual cylinders, said control device comprising:

a controller for controlling fuel supply to the individual cylinders;

wherein the supercharger supercharges intake air supplied to the preceding cylinder, combustion in the preceding cylinder is made under lean mixture conditions at an air-fuel ratio larger than the stoichiometric air-fuel ratio, the burned gas discharged from the preceding cylinder is introduced directly into the following cylinder, combustion in the following cylinder is made under conditions of the stoichiometric air-fuel ratio by supplying the fuel to the burned gas of a large air-fuel ratio introduced from the preceding cylinder at least in a part-load range, and exhaust gas discharged from the exhaust port of the following cylinder is caused to pass through the three-way catalyst.

* * * * *